(12) United States Patent
Xia et al.

(10) Patent No.: US 12,438,633 B2
(45) Date of Patent: Oct. 7, 2025

(54) METHOD OF HIGH PRECISION TIME SYNCHRONIZATION WITH A COMMUNICATION NETWORK GRANDMASTER FOR USER PLANE FUNCTION

(71) Applicant: Hong Kong Applied Science And Technology Research Institute Co., Ltd., Shatin (HK)

(72) Inventors: Liang Xia, Shatin (HK); Jianjun Zhang, Shatin (HK); Wei Li, Shatin (HK); Liang Dong, Tai Po (HK)

(73) Assignee: Hong Kong Applied Science And Technology Research Institute Co., Ltd, Shatin (HK)

( * ) Notice: Subject to any disclaimer, the term of this patent is extended or adjusted under 35 U.S.C. 154(b) by 469 days.

(21) Appl. No.: 18/110,594

(22) Filed: Feb. 16, 2023

(65) Prior Publication Data

US 2024/0283555 A1 Aug. 22, 2024

(51) Int. Cl.
*H04J 3/06* (2006.01)
*H04W 56/00* (2009.01)

(52) U.S. Cl.
CPC ....... *H04J 3/0667* (2013.01); *H04W 56/0015* (2013.01)

(58) Field of Classification Search
CPC .......................... H04J 3/0667; H04W 56/0015
See application file for complete search history.

(56) References Cited

U.S. PATENT DOCUMENTS 11,599,090 B2 * 3/2023 Seidlitz ................ H04J 3/0667
2020/0351804 A1   11/2020 Moon et al.
2021/0360548 A1 * 11/2021 Chandramouli .. H04W 56/0015
(Continued)

FOREIGN PATENT DOCUMENTS

EP   4187875 A1 *  5/2023 ............ H04W 76/11
WO  2020151806 A1    7/2020
(Continued)

OTHER PUBLICATIONS

Kang et al., "Time-Sensitive Networking Technologies for Industrial Automation in Wireless Communication Systems", energies, , vol. 14, No. 4997, Publisher: MDPI; 2021.
(Continued)

*Primary Examiner* — Wutchung Chu
(74) *Attorney, Agent, or Firm* — GableGotwals

(57) ABSTRACT

Described is a method of synchronizing a TSN NW-TT module inside a UPF with a Grandmaster (GM) in a Time Domain of the communication network. The method comprises receiving one or more PTP or gPTP messages on an N3 interface of the UPF. The method includes determining a first time offset value between the GM and the UPF N3 interface based on information received in the PTP or gPTP messages. A timing of the UPF N3 interface is adjusted using the determined first time offset value to synchronize the time between the UPF N3 interface and the GM. The method includes determining a second time offset value between the UPF N3 interface and the NW-TT module. A timing of the NW-TT module is adjusted using the determined second time offset value to synchronize the time between the NW-TT module and the GM.

20 Claims, 10 Drawing Sheets

(56) References Cited

U.S. PATENT DOCUMENTS

| | | | |
|---|---|---|---|
| 2021/0367695 A1 | 11/2021 | Moon et al. | |
| 2022/0174625 A1 | 6/2022 | Xiong | |
| 2022/0216932 A1 | 7/2022 | Wang et al. | |
| 2022/0338142 A1* | 10/2022 | Minokuchi | H04W 56/001 |
| 2022/0394647 A1* | 12/2022 | Moon | H04J 3/0667 |
| 2023/0068462 A1* | 3/2023 | Moon | H04W 56/001 |
| 2023/0104424 A1* | 4/2023 | Diachina | H04W 56/0065 370/350 |
| 2023/0134036 A1* | 5/2023 | Larsson | H04W 56/004 370/350 |
| 2023/0189338 A1* | 6/2023 | Singh | H04W 74/0816 370/329 |
| 2023/0389119 A1* | 11/2023 | Araujo | H04W 76/15 |
| 2024/0356687 A1* | 10/2024 | Speicher | H04J 3/0667 |
| 2025/0030495 A1* | 1/2025 | Li | H04J 3/0667 |

FOREIGN PATENT DOCUMENTS

| | | | |
|---|---|---|---|
| WO | 2021219227 A1 | 11/2021 | |
| WO | 202123865 A1 | 12/2021 | |

OTHER PUBLICATIONS

Qualcomm Incorporated, "Time synchronisation using TSN directly in RAN", Jan. 25, 2019, Publisher: 3GPP TSG-SA WG2 Meeting #130, S2-1901148, Published in: India.

\* cited by examiner

METHOD OF HIGH PRECISION TIME SYNCHRONIZATION WITH A COMMUNICATION NETWORK GRANDMASTER FOR USER PLANE FUNCTION

FIELD OF THE INVENTION

The invention relates to a method of high precision time synchronization with a New Radio (NR) communication network Grandmaster (GM) especially for 5G User Plane Function (UPF). The invention is particularly useful for TSN technologies in wireless communication systems.

BACKGROUND OF THE INVENTION

Fifth-generation (5G) wireless communications and Time-Sensitive Networking (TSN) are key technologies for, for example, industrial communications such as 5G for wireless connectivity and TSN for wired connectivity. In addition to enhanced mobile bandwidth, 5G supports communications with unprecedented reliability and very low latency, as well as massive Internet of Things (IoT) connectivity.

TSN comprises a collection of Ethernet standards introduced by the Institution of Electrical and Electronic Engineers (IEEE) 802.1 group, defining mechanisms for deterministic communication over wired Ethernet links enabling guaranteed packet transport with bounded latency, low packet delay variation, and extremely low packet loss. Both technologies have been designed to provide converged communication for a wide range of services on a common network infrastructure. Significant benefits can be achieved by enabling TSN and 5G to work together.

For a seamless integration between a 5G system (5GS) and a TSN system, it was proposed by the 3rd Generation Partnership Project (3GPP) that the two systems interoperate in a transparent manner to minimize impact on other TSN entities. Therefore, the 5G system acts as one or more virtual TSN bridges of the TSN network. This virtual bridge model defines several gateways between the TSN and the 5G system including a network-side TSN translator (NW-TT) on the user plane function (UPF) side.

The Precision Time Protocol (PTP) or Generalized PTP (gPTP) is a computer networking protocol for synchronizing network elements' clocks. It is an important part of 5G mobile networks which require accurate time sources. The PTP or gPTP is a protocol used to synchronize clocks throughout the communication network, achieving clock accuracy in the sub-microsecond range, making it the perfect choice where strict time synchronization requirements must be met.

A PTP or gPTP system is formed by a clock source, a Grandmaster (GM), that transmits synchronization information toward multiple clock targets (slave devices).

IEEE 802.1AS comprises the IEEE standard for time synchronization of time-sensitive applications in local and metropolitan area networks using gPTP. GM/Slave refers to the timing source in the network being generated by a gPTP GM. The Slave clock utilizes an offset to adjust its time to agree with the Master clock. Other than offset adjustment, the clock frequency of the Slave should also be synchronized with the gPTP GM. Without frequency synchronization, the time of the Slave might still run faster or slower than the GM.

The 5G network supports time synchronization as defined by IEEE 802.1AS across 5G-based logical TSN bridges with Ethernet PDU (Packet Data Unit) session type in the TSN Time Domain. The 5G-based logical TSN bridge needs to calculate the residence time of the 5G network. The 5G network provides an internal system clock for 5G internal synchronization where the base station (gNB), the NW-TT at the UPF side and the device side TST translator (DS-TT) at the User Equipment (UE) side should all be synchronized in the 5G Time Domain with the 5G GM for residence time calculation.

TSN over 5G systems brings numerous benefits to communication networks, but these do not come without challenges.

What is desired is a method to assist time synchronization of an NW-TT module in the UPF with GM in the Time Domain, which is a key step for further supporting high precision time synchronization of TSN end stations over the communications network.

OBJECTS OF THE INVENTION

An object of the invention is to mitigate or obviate to some degree one or more problems associated with known methods of supporting high precision time synchronization of TSN end stations over the communications network.

The above object is met by the combination of features of the main claims; the sub-claims disclose further advantageous embodiments of the invention.

Another object of the invention is to provide a method and system to assist time synchronization of an NW-TT module in the UPF with GM in the Time Domain.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of synchronizing a Network-Side Time-Sensitive Networking (TSN) Translator (NW-TT) module inside a User Plane Function (UPF) of a communication network with a Grandmaster (GM) in a Time Domain of the communication network. The method comprises receiving one or more Precision Time Protocol (PTP) or Generalized Precision Time Protocol (gPTP) messages on an N3 interface of the UPF. The method includes determining a first time offset value ($Offset_{N3}$) between the GM and the UPF N3 interface based on information received in the one or more PTP or gPTP messages. A timing of the UPF N3 interface is adjusted using the determined first time offset value ($Offset_{N3}$) to synchronize the time between the UPF N3 interface and the GM. The method includes determining a second time offset value ($Offset_{NW-TT}$) between the UPF N3 interface and the NW-TT module. A timing of the NW-TT module is adjusted using the determined second time offset value ($Offset_{NW-TT}$) to synchronize the time between the NW-TT module and the GM.

Preferably, the method includes using the determined first time offset value ($Offset_{N3}$) to determine a UPF N3 interface clock frequency adjustment value, adjusting a clock frequency of the UPF N3 interface using the UPF N3 interface clock frequency adjustment value, using the second time offset value ($Offset_{NW-TT}$) to determine a NW-TT module clock frequency adjustment value, and adjusting a clock frequency of the NW-TT module using the NW-TT module clock frequency adjustment value.

In a second main aspect, the invention provides a UPF module for synchronizing a Network-Side Time-Sensitive Networking (TSN) Translator (NW-TT) module inside a User Plane Function (UPF) of a communication network with a Grandmaster (GM) in a Time Domain of the communication network, the module comprising a memory storing machine-readable instructions and a processor for executing the machine-readable instructions such that, when the processor executes the machine-readable instructions, it configures the UPF module to perform the steps of the first main aspect of the invention.

In a third main aspect, the invention provides a Data Plane Clock Servo module in a UPF module for synchronizing a Network-Side Time-Sensitive Networking (TSN) Translator (NW-TT) module inside a User Plane Function (UPF) of a communication network with a Grandmaster (GM) in a Time Domain of the communication network. The Data Plane Clock Servo module comprises: a first module for receiving a first time offset value (Offset$_{N3}$) between the GM and a UPF N3 interface or a second time offset value (Offset$_{NW-TT}$) between the UPF N3 interface and the NW-TT module, the first time offset value (Offset$_{N3}$) being determined from one or more Precision Time Protocol (PTP) or Generalized Precision Time Protocol (gPTP) messages received at the N3 interface, and the second time offset value (Offset$_{NW-TT}$) being determined from a hardware clock of the NW-TT module and a synchronized clock of the UPF N3 interface; a second module for determining if the received first time offset value (Offset$_{N3}$) or second time offset value (Offset$_{NW-TT}$) is greater than a predetermined, calculated or selected time period; a Data Plane Clock Filter comprising a moving average filter which, upon receiving the first time offset value (Offset$_{N3}$) or the second time offset value (Offset$_{NW-TT}$), smooths the received first time offset value (Offset$_{N3}$) or second time offset value (Offset$_{NW-TT}$) to attenuate impulse noise to generate a smoothed clock offset output for the 5G Data Plane Clock Offset Controller; a Data Plane Proportional-integral (PI) Controller for receiving the smoothed clock offset output for the received first time offset value (Offset$_{N3}$) or second time offset value (Offset$_{NW-TT}$) to produce a fractional tick-rate adjustment u(t) value which coordinates the UPF N3 interface time with the GM tie or coordinates the NW-TT module time with the UPF N3 interface time; and a Data Plane Clock Frequency Adjuster for receiving the fractional tick-rate adjustment u(t) value for the UPF N3 interface or the NW-TT module to adjust the respective clock frequency accordingly; wherein the Data Plane Clock Offset Controller receives the smoothed clock offset output and adjusts the timing of the UPF N3 interface or the timing of the NW-TT module.

In a fourth main aspect, the invention provides a non-transitory computer-readable medium storing machine-readable instructions, wherein, when the machine-readable instructions are executed by a processor, they configure the processor to implement the method of the first main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
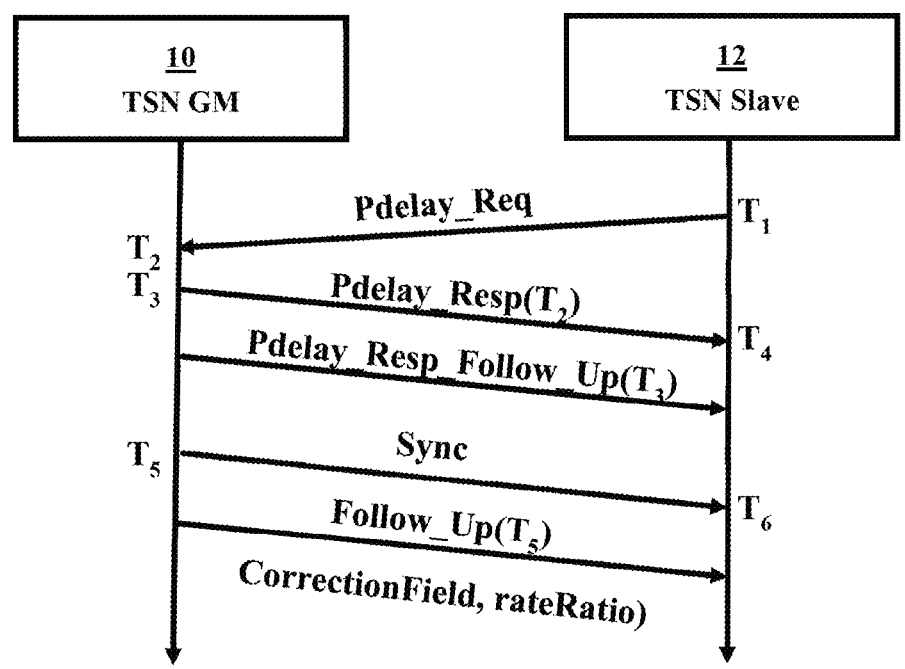
FIG. 1 is a timing diagram for time synchronization of time-sensitive applications in local and metropolitan area networks in accordance with IEEE 802.1AS.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

References to 5G radio equipment in the following description do not exclude the application of the methods described herein to radio equipment of compatible mobile communications systems.

The following description describes implementation of the present invention in a 5G communications network by way of example, but without limitation to implementation of the invention in suitable communications networks.

FIG. 1 provides a timing diagram for time synchronization of time-sensitive applications in local and metropolitan area networks in accordance with IEEE 802.1AS by way of example of a known timing offset adjustment method.

IEEE 802.1AS "IEEE Standard for Local and Metropolitan Area Networks—Timing and Synchronization for Time-Sensitive Applications" provides protocols, procedures, and managed objects for the transport of timing over local and metropolitan area networks.

Referring to FIG. 1, the timing source in the network is generated by a gPTP GM ("TSN GM") 10. The Slave clock ("TSN Slave") 12 utilizes an offset to adjust its time to agree with the Master clock of the gPTP GM 10.

The steps for determining or calculating the offset includes first calculating a timing delay value related to the "Pdelay_Req" message and the "Pdelay_Response(T2)" message. The timing delay value is given by:

$$\text{Delay} = [(T_2 - T_1) + (T_4 - T_3)]/2.$$

In a next step, a value for the timing offset for adjusting the timing of the Slave clock 12 to agree with the Master clock of the gPTP GM 10 makes use of the timing of the "Synch" message and is given by:

$$\text{Offset} = T_6 - T_5 - \text{Delay}.$$

Other than the offset timing adjustment, the clock frequency of the Slave clock 12 should also be synchronized with the gPTP GM 10, because, without clock frequency synchronization, the Slave clock 12 may still run faster or slower than the Master clock of the gPTP GM 10 despite the step of adjusting the timing of the Slave clock 12 to agree with the Master clock of the gPTP GM 10 using the determined timing offset value.

The "Follow_Up" message in the timing diagram of FIG. 1 includes a correction field containing the message transit time and residence time as well as the "rateRatio" containing logical syntonization of a time aware system to the gPTP GM 10 frequency rate. The correction field C carries the time elapsed in the timeaware systems and on the links on the path between the gPTP GM 10 and the time-aware system preceding a last hop. The rate ratio allows for logical syntonization of a timeaware system to the gPTP GM 10 frequency rate.

IEEE 802.1AS-2011 defines the gPTP profile which, like all profiles of IEEE 1588, selects options from IEEE 1588, but also generalizes the network architecture to allow PTP to apply beyond wired Ethernet networks.

IEEE 1588 "IEEE Standard for a Precision Clock Synchronization Protocol for Networked Measurement and Control Systems". defines a protocol enabling precise synchronization of clocks in measurement and control systems implemented with technologies such as network communication, local computing and distributed objects. The protocol is applicable to systems communicating by local area networks supporting multicast messaging including but not limited to Ethernet.

It will be understood therefore that nothing in the following description prevents the method in accordance with the invention being implemented as PTP packets in an IEEE 1588 compliant network as well as gPTP packets in an IEEE 802.1AS compliant network. The method of the invention enables both peer-to-peer mode of time synchronization using gPTP as well as end-to-end mode of time synchronization using PTP.

Figure 2:
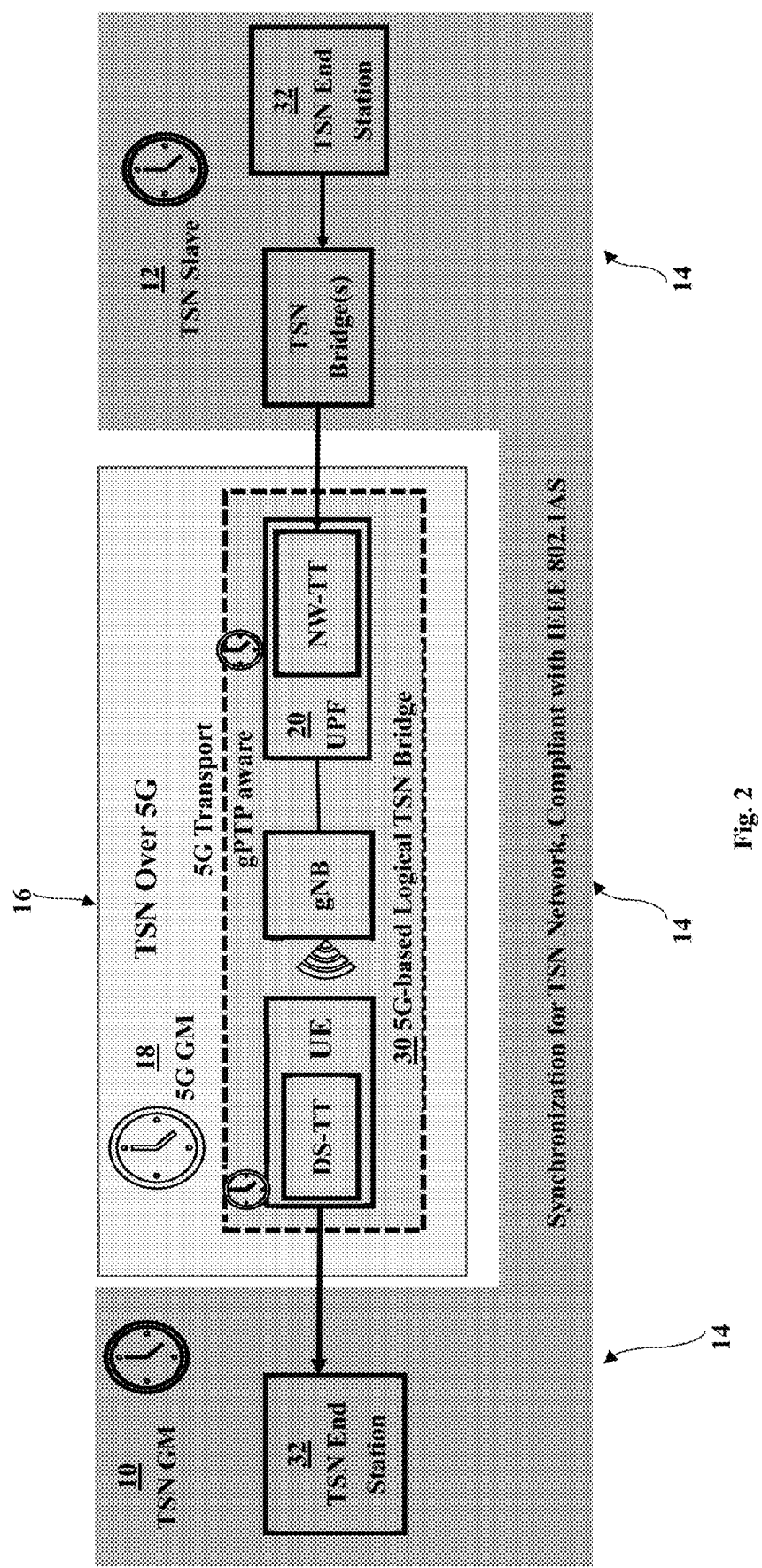
FIG. 2 is a block schematic diagram illustrating the TSN Time Domain and the 5G Time Domain in an IEEE 802.1AS compliant TSN Network.

FIG. 2 provides a block schematic diagram illustrating the TSN Time Domain 14 and the 5G Time Domain 16 in a known IEEE 802.1AS compliant TSN Network.

The TSN Time Domain 14 for the 5G network supports time synchronization (as defined by IEEE 802.1AS) across 5G-based logical TSN bridge(s) with Ethernet Packet Data Unit (PDU) session type in the TSN Time Domain 14. The 5G-based logical TSN bridge(s) needs to calculate the residence time of the 5G network.

The 5G Time Domain 16 for the 5G network provides an internal system clock for 5G internal synchronization where the gNB, the NW-TT at UPF side 20 and the DS-TT at UE side should all be synchronized in the 5G Time Domain with a 5G GM 18 for residence time calculation.

The present invention focuses on time synchronization in the 5G Time Domain 16 as will be described more fully hereinafter.

Figure 3:
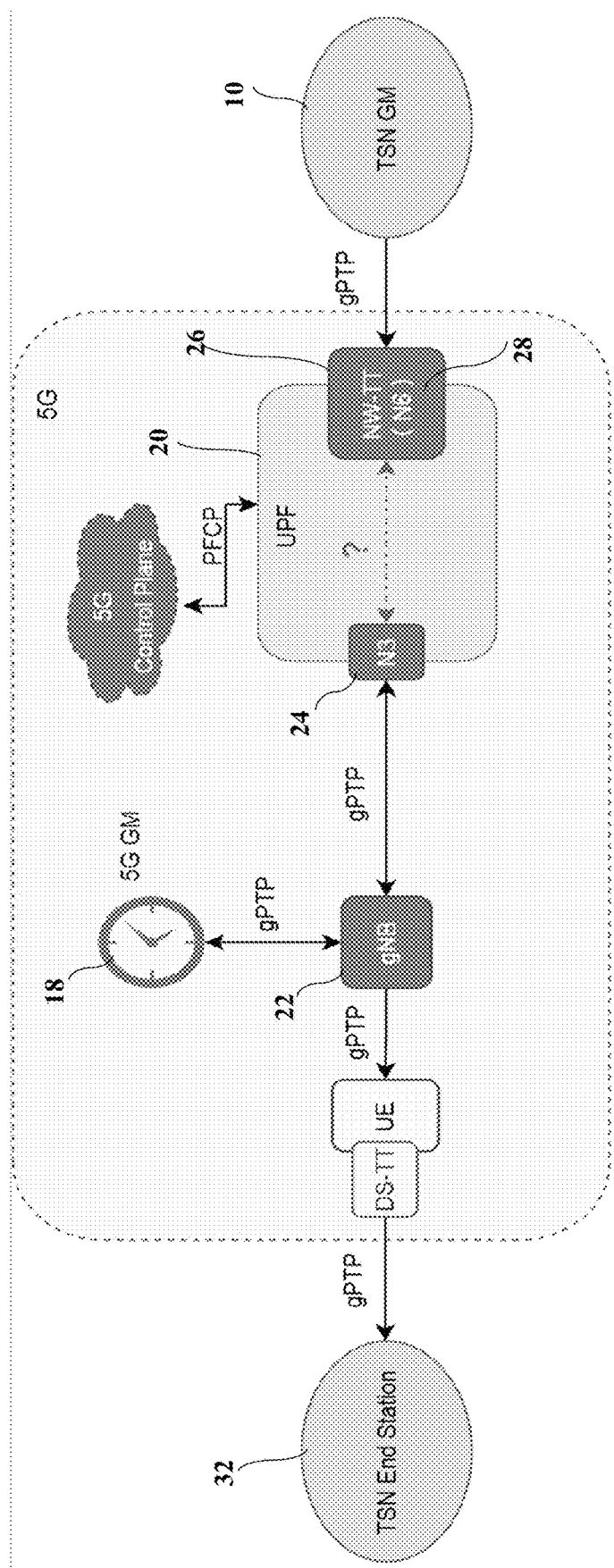
FIG. 3 is a block schematic diagram illustrating in more detail the UPF in an IEEE 802.1AS compliant TSN Network.

FIG. 3 provides a block schematic diagram illustrating in more detail the UPF 20 in the IEEE 802.1AS compliant TSN Network of FIG. 2.

Referring to FIG. 3, the gNB 22 and the N3 interface 24 of the UPF 20 synchronize time through the gPTP protocol in accordance with the 3GPP specifications. However, the method by which the NW-TT module 26 at the N6 interface 28 on the UPF 20 synchronizes its time with the UPF N3 interface 24 is outside the scope of the 3GPP specifications. In the 3GPP specifications, the NW-TT module 26 is based on the N6 interface 28 of the UPF 20. In most cases, the N3 interface 24 and the N6 interface-based NW-TT module 26 on the same UPF 20 use different network interfaces. However, different network interfaces commonly use different sources of oscillator and thus typically have different hardware clock sources which may vary in their respective timings. Without time synchronization of the NW-TT module 26 in the UPF 20 with the 5G GM 18 in the 5G Time Domain 16, the residence time calculation of any 5G-based logical TSN bridge 30 (FIG. 2) will be incorrect, which will cause incorrect time synchronization of TSN end stations 32 over the 5G communications network.

Figure 6:
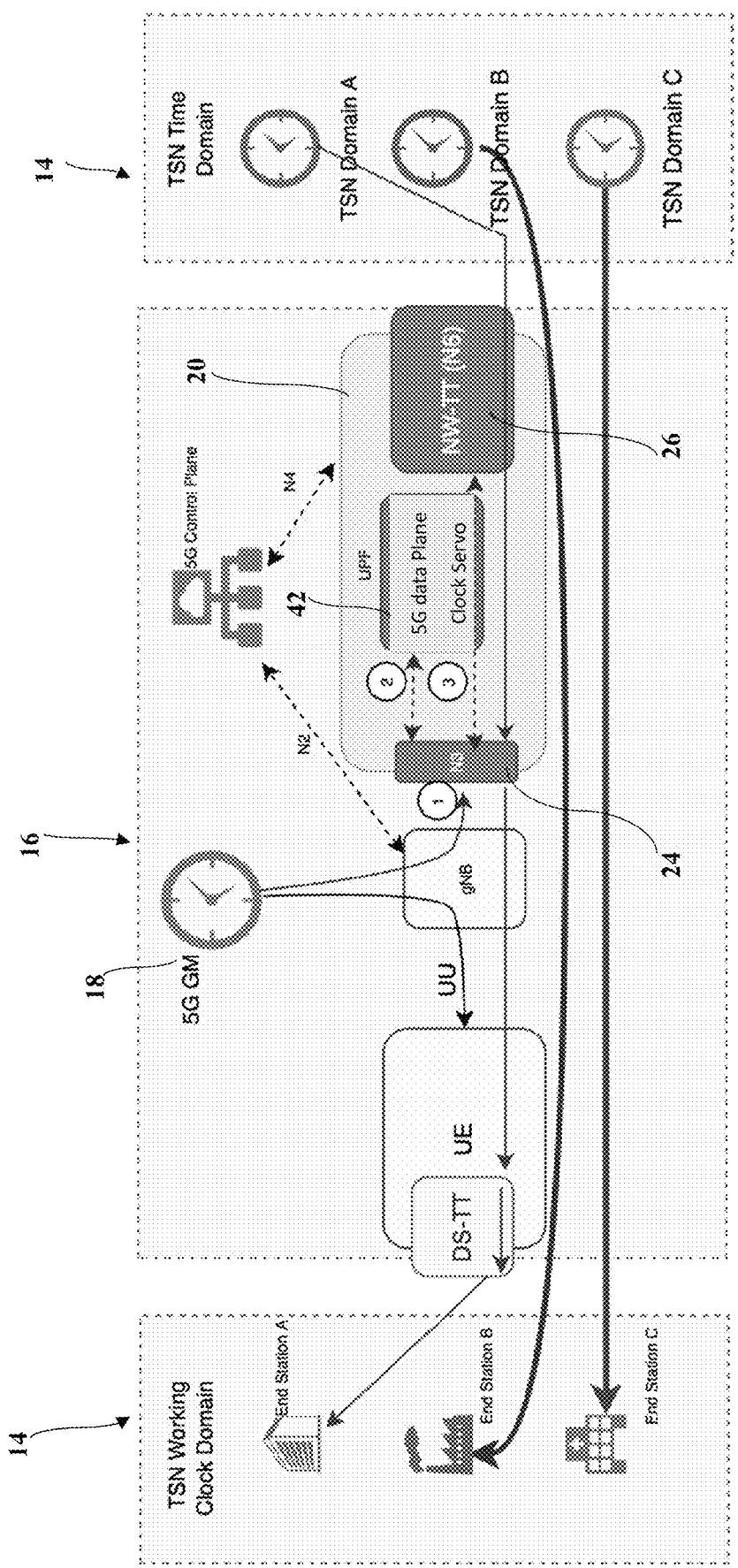
FIG. 6 is a block schematic diagram of the TSN Time Domain and the 5G Time Domain of a TSN Network illustrating the steps of the method in accordance with the invention.

The present invention addresses the problem of how to enable the NW-TT module 26 in the UPF 20 to track the 5G GM 18 precisely with at least time synchronization and preferably also frequency synchronization. To this end, the present invention provides, as illustrated by FIG. 4, a 5G Data Plane Clock Servo module 40 in the UPF 20 as illustrated in FIG. 6.

Figure 4:
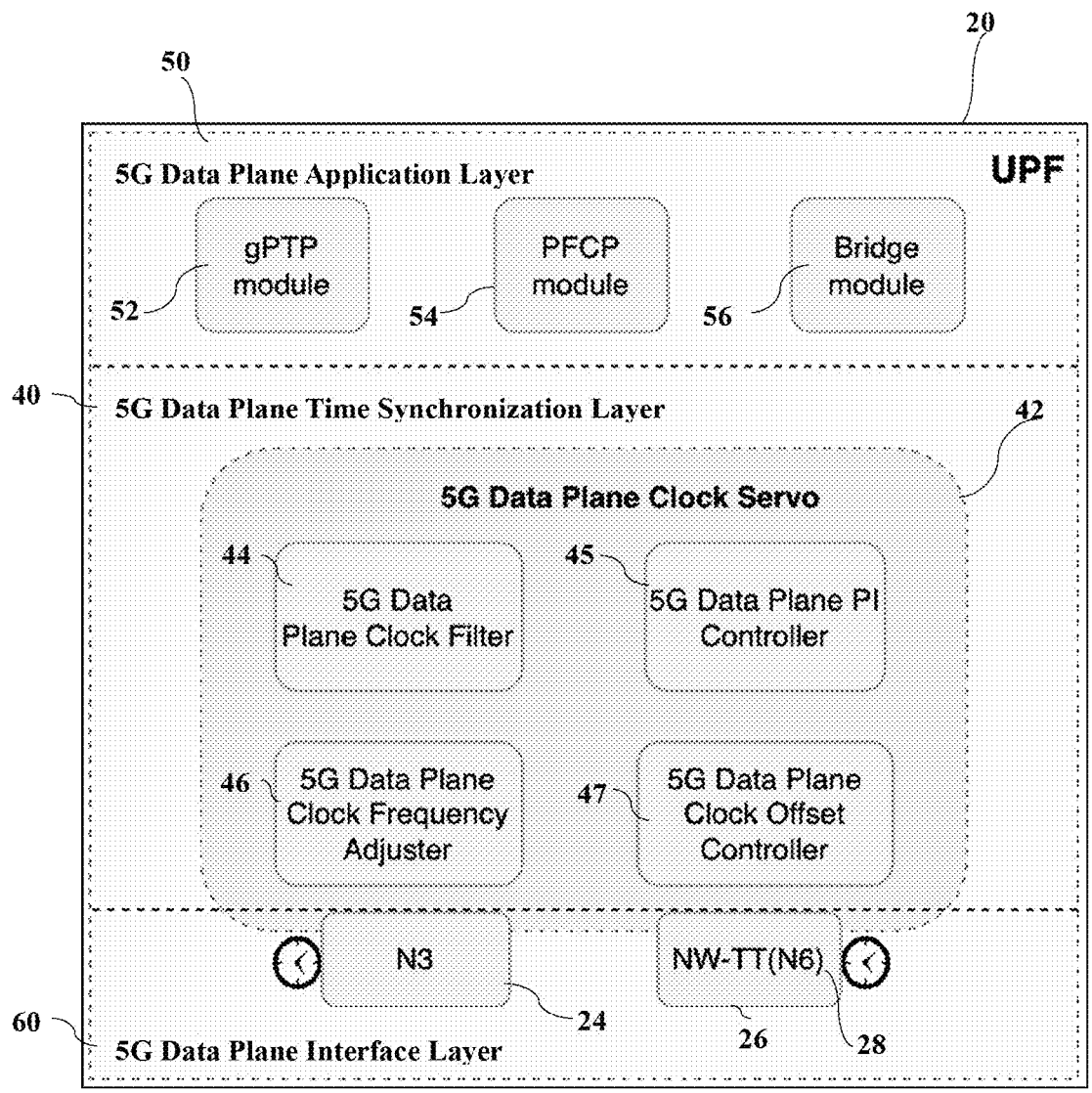
FIG. 4 is a functional block schematic diagram of a 5G Data Plane Clock Servo module in accordance with the invention.

FIG. 4 is a functional block schematic diagram of the 5G Data Plane Clock Servo module 42 in accordance with the invention. Shown also is a 5G Data Plane Application Layer 50 comprising a gPTP module 52, a Packet Forwarding Control Protocol module 54 and a Bridge module 56. The UPF N3 interface 24 and the NW-TT module 26 based at the N6 interface 28 are provided in a 5G Data Plane Interface Layer 60.

The 5G Data Plane Clock Servo module 42 is provided in a 5G Data Plane Time Synchronization layer 40 and comprises a 5G Data Plane Clock Filter 44, a 5G Data Plane Proportional-integral (PI) Controller 45, a 5G Data Plane Clock Frequency Adjuster 46, and a 5G Data Plane Clock Offset Controller 47.

The 5G Data Plane Clock Filter 44 preferably comprises a moving average filter which, upon receiving a first time offset value or a second time offset value, as described more fully hereinafter, smooths the received first time offset value or second time offset value to attenuate impulse noise to generate a smoothed clock offset output for the 5G Data Plane Clock Offset Controller 47.

The 5G Data Plane Proportional-integral (PI) Controller 45 for receives the smoothed clock offset output for the received first time offset value or second time offset value to produce a fractional tick-rate adjustment u(t) value which coordinates the UPF N3 interface 24 time with the 5G GM 18 time or coordinates the NW-TT module 26 time with the UPF N3 interface 24 time.

The 5G Data Plane Clock Frequency Adjuster 46 receives the fractional tick-rate adjustment u(t) value for the UPF N3 interface 24 or the NW-TT module 26 to adjust the respective clock frequency accordingly.

The 5G Data Plane Clock Offset Controller 47 receives the smoothed clock offset output and adjusts the timing of the UPF N3 interface 24 or the timing of the NW-TT module 26.

Figure 5:
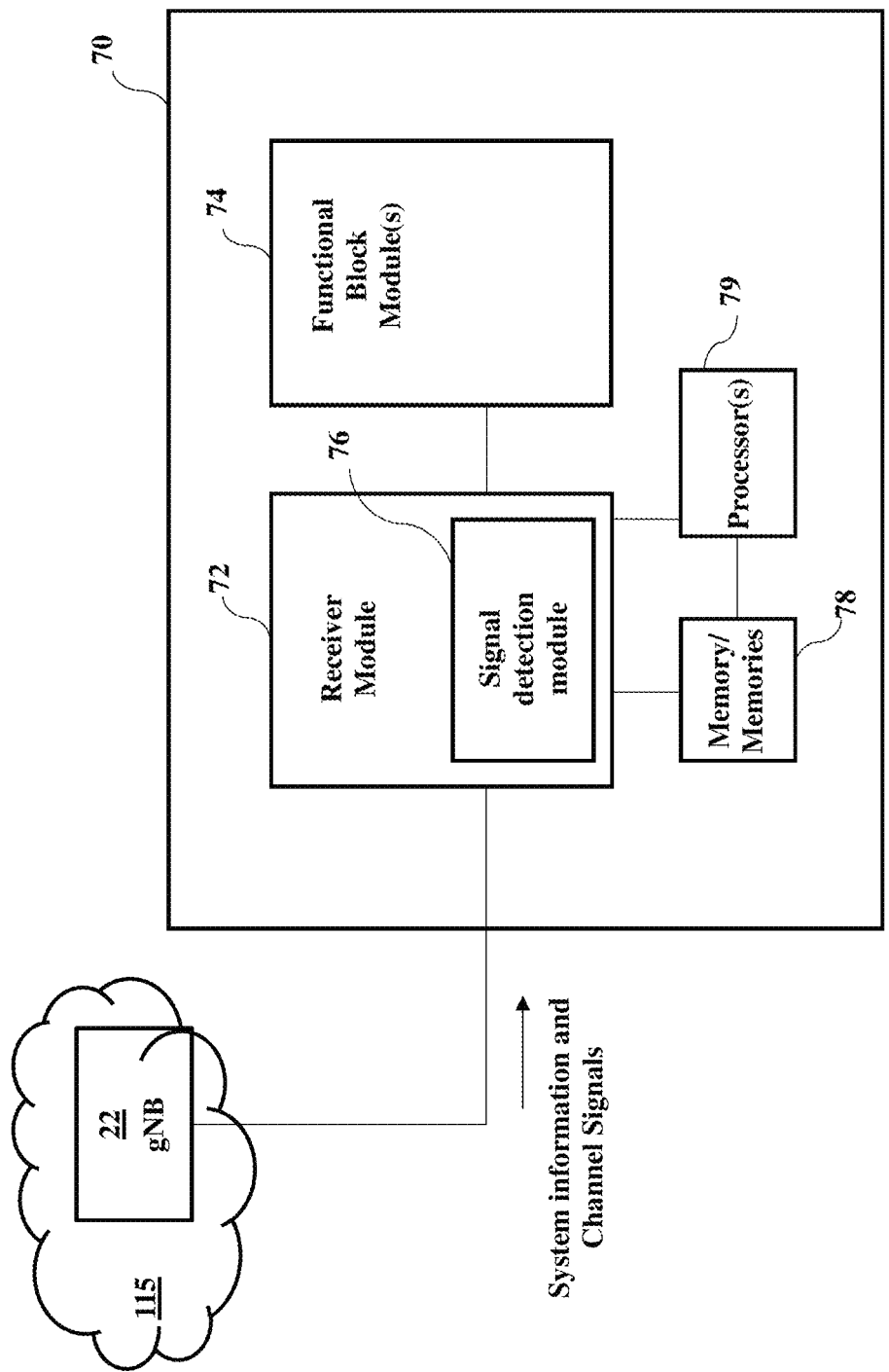
FIG. 5 is a block schematic diagram of an improved radio equipment, device or network node comprising the 5G Data Plane Clock Servo module in accordance with the invention.

FIG. 5 is a block schematic diagram of an improved radio equipment, device or network node comprising the 5G Data Plane Clock Servo module 42 in accordance with the invention. The improved radio equipment device 70 is connected to a gNB 22 operating in a 5G NR communications system environment, although the improved radio equipment device 70 of the invention is not limited to operating in a NR 5G communications system but could comprise a radio equipment device for any suitable communications network.

The radio equipment device 70 may comprise a plurality of functional blocks for performing various functions thereof. For example, the radio equipment device 70 includes receiver module 72 providing received signal processing and configured to provide received signals and/or information extracted therefrom to functional block module(s) 74 such as may comprise various data sink, control element(s), user interface(s), etc. Although receiver module 72 is described as providing received signal processing, it will be appreciated that this functional block may be implemented as a transceiver providing both transmitted and received signal processing. Irrespective of the particular configuration of receiver module 72, embodiments include signal detection module 76 disposed in association with the receiver module 72 for facilitating accurate processing and/or decoding of received information and channel signals in accordance with the invention.

Although the signal detection module 76 is shown as being deployed as part of the receiver module 72 (e.g., comprising a portion of the radio equipment module control and logic circuits), there is no limitation to such a deployment configuration according to the concepts of the invention. For example, the signal detection module 76 may be deployed as a functional block of radio equipment device 70 that is distinct from, but connected to, receiver module 72. The signal detection module 76 may, for example, be implemented using logic circuits and/or executable code/machine readable instructions stored in a memory 78 of the radio equipment device 70 for execution by a processor 79 to thereby perform functions as described herein. For example, the executable code/machine readable instructions may be stored in one or more memories 78 (e.g., random access memory (RAM), read only memory (ROM), flash memory, magnetic memory, optical memory or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 78 may comprise processor-readable memories for use with respect to one or more processors 79 operable to execute code segments of signal detection module 76 and/or utilize data provided thereby to perform functions of the signal detection module 76 as described herein. Additionally, or alternatively, the signal detection module 76 may comprise one or more special purpose processors (e.g., application specific integrated circuit (ASIC), field programmable gate array (FPGA), graphics processing unit (GPU), and/or the like configured to perform functions of the signal detection module 76 as described herein. The signal detection module 76 comprises the 5G Data Plane Clock Servo module 42 in accordance with the invention.

FIG. 6 is a block schematic diagram of the TSN Time Domain 14 and the 5G Time Domain 16 of the TSN Network outlining the steps of the method in accordance with the invention.

The UPF 20 transmits the gPTP messages between the TSN end stations for time synchronization in multiple TSN Time Domains as illustrated in the known manner. Meanwhile, The NW-TT module 26 in the UPF 20 also needs to synchronize its time with the 5G GM 18 in the 5G Time Domain 16. The steps for time synchronization of the NW-TT module 26 with the 5G GM 18 in the 5G Time Domain 16 according to the invention involve a first part ① comprising the UPF 20 receiving or obtaining the 5G GM 18 clock via the underlying gPTP compatible transport network through the UPF N3 interface 24 by receiving one or more gPTP messages and then determining or calculating the first time offset value (Offset$_{N3}$) between the 5G GM 18 and the UPF N3 interface 24 based on information received in said one or more gPTP messages. In a second part ②, the UPF 20 adjusts a time of the UPF N3 interface 24 using the determined first time offset value (Offset$_{N3}$) to synchronize the time between the UPF N3 interface 24 and the 5G GM 18. Preferably, the UPF 20 adjusts the time of the UPF N3 interface 24 using a smoothed value of the time offset value (Offset$_{N3}$) In a third part ③, the UPF 20 also determines a second time offset value (Offset$_{NW-TT}$) between the UPF N3 interface 24 and the NW-TT module 26 and adjusts a time of the NW-TT module 26 using the determined second time offset value (Offset$_{NW-TT}$) to synchronize the time between the NW-TT module 26 and the 5G GM 18. Preferably, the UPF 20 adjusts the time of the NW-TT module 26 using a smoothed value of the second time offset value (Offset$_{NW-TT}$).

In the second part ②, the UFPF 20 preferably uses the determined first time offset value (Offset$_{N3}$) to determine a UPF N3 interface 24 clock frequency adjustment value and to adjust a clock frequency of the UPF N3 interface 24 using said UPF N3 interface clock frequency adjustment value. This may involve using the first time offset value (Offset$_{N3}$) as an input to the 5G Data Plane Clock Servo module 42 in the UPF 20 and based on said first time offset value (Offset$_{N3}$), performing the steps at the 5G Data Plane Clock Servo module of part ②.

In the third part ③, the UFPF 20 preferably uses the second time offset value (Offset$_{NW-TT}$) to determine a NW-TT module 26 clock frequency adjustment value and adjust a clock frequency of the NW-TT module 26 using the NW-TT module clock frequency adjustment value. This may involve using the using the second time offset value (Offset$_{NW-TT}$) as an input to the 5G Data Plane Clock Servo module 42 and, based on said second time offset value (Offset$_{NW-TT}$), performing the steps at the 5G Data Plane Clock Servo module 42 of: part ③.

Figure 7:
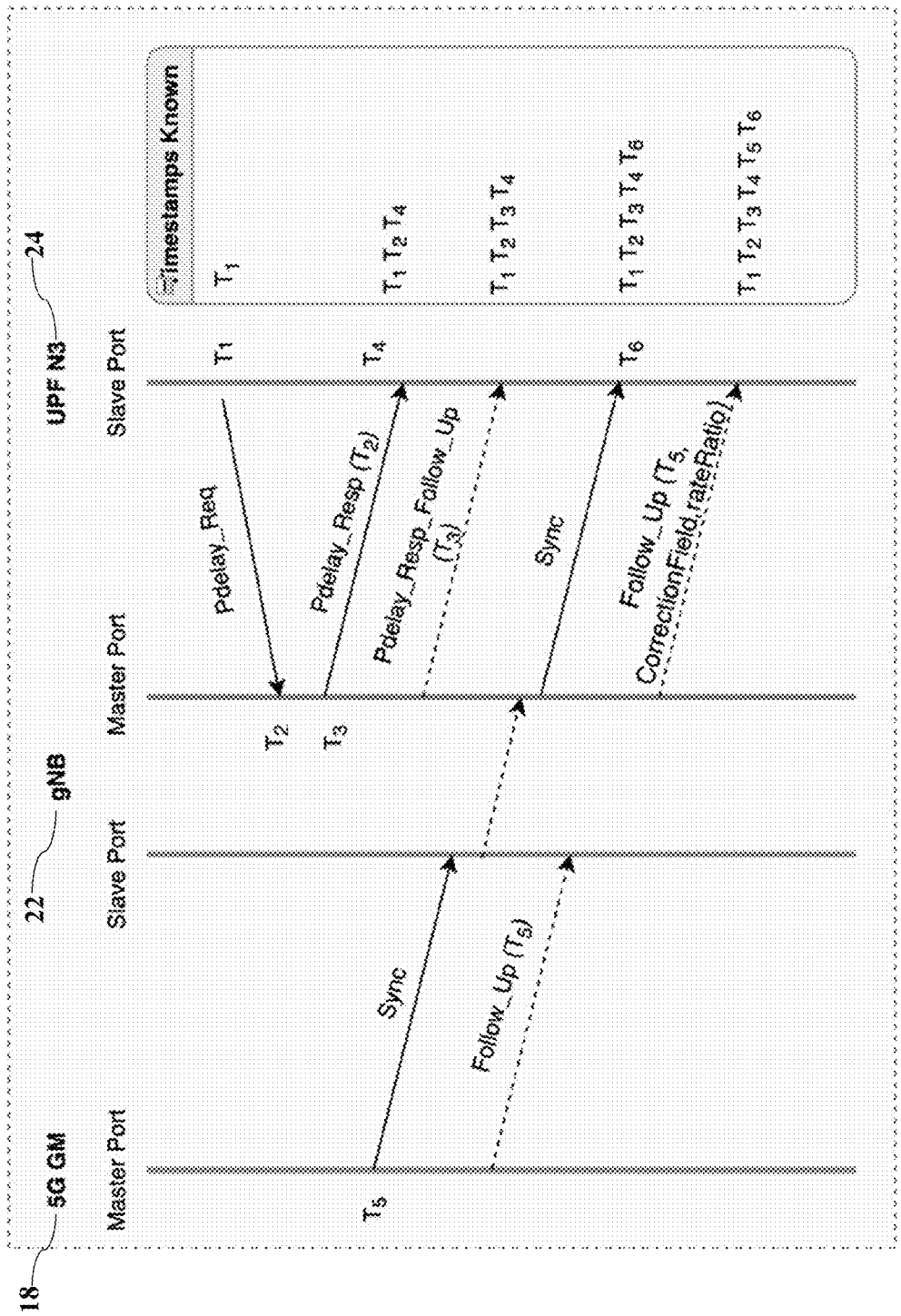
FIG. 7 is a timing diagram showing transmission of time synchronization information for three adjacent time-aware systems in a TSN Network implementing the method in accordance with the invention.

FIG. 7 is a timing diagram showing transmission of time synchronization information for three adjacent time-aware systems in a TSN Network implementing the method in accordance with the invention.

The one or more PTP or gPTP messages received by the UPF N3 interface 24 of the UPF 20 contain synchronization information in peer-to-peer mode or end-to-end mode. The method comprises the steps of storing a first time $T_1$ relating to sending a PTP or gPTP "Pdelay_Req" message, extracting a second time $T_2$ from a PTP or gPTP "Pdelay_Resp" message, extracting a third time $T_3$ from a PTP or gPTP "Pdelay_Resp_Follow_Up" message, storing a fourth time $T_4$ relating to receiving a PTP or gPTP "Pdelay_Resp" message, and then determining a UPF N3 interface delay (Delay$_{N3}$) from the formula:

$$\text{Delay}_{N3} = [(T_2 - T_1) + (T_4 - T_3)]/2.$$

The first time offset value (Offset$_{N3}$) between the 5G GM 18 and the UPF N3 interface 24 is derived from the UPF N3 interface delay (Delay$_{N3}$). To obtain the first time offset value (Offset$_{N3}$) between the 5G GM 18 and the UPF N3 interface 24, the method includes the steps of extracting a fifth time $T_5$ and a Correction Field (CF) elapsed time value from a PTP or gPTP "Follow_Up" message, storing a sixth time $T_6$ relating to receiving a PTP or gPTP "Sync message", and then determining the first time offset value (Offset$_{N3}$) between the 5G GM and the UPF N3 interface from the formula:

$$\text{Offset}_{N3} = (T_6 - T_5) - \text{Delay}_{N3} - CF \text{ elapsed time value}.$$

The CF carries the time elapsed in the time-aware systems and on the links on the path between the 5G GM 18 and the time-aware system preceding the last hop. In this case it is the transmit time from a 5G GM master port to a gNB master port.

The second time offset value (Offset$_{NW-TT}$) between the UPF N3 interface and the NW-TT module is determined from a clock of the NW-TT module 26 and a synchronized clock of the UPF N3 interface 24 from the formula:

$$\text{Offset}_{NW-TT} = T_{NW-TT} - T_{N3},$$

where $T_{NW-TT}$ is a time retrieved from the NW-TT module clock; and $T_{N3}$ is a time retrieved from the UPF N3 interface synchronized clock.

The second time offset value (Offset$_{NW-TT}$) between the UPF N3 interface and the NW-TT module is determined or calculated by the 5G Data plane Clock Offset Controller 47.

Figure 8:
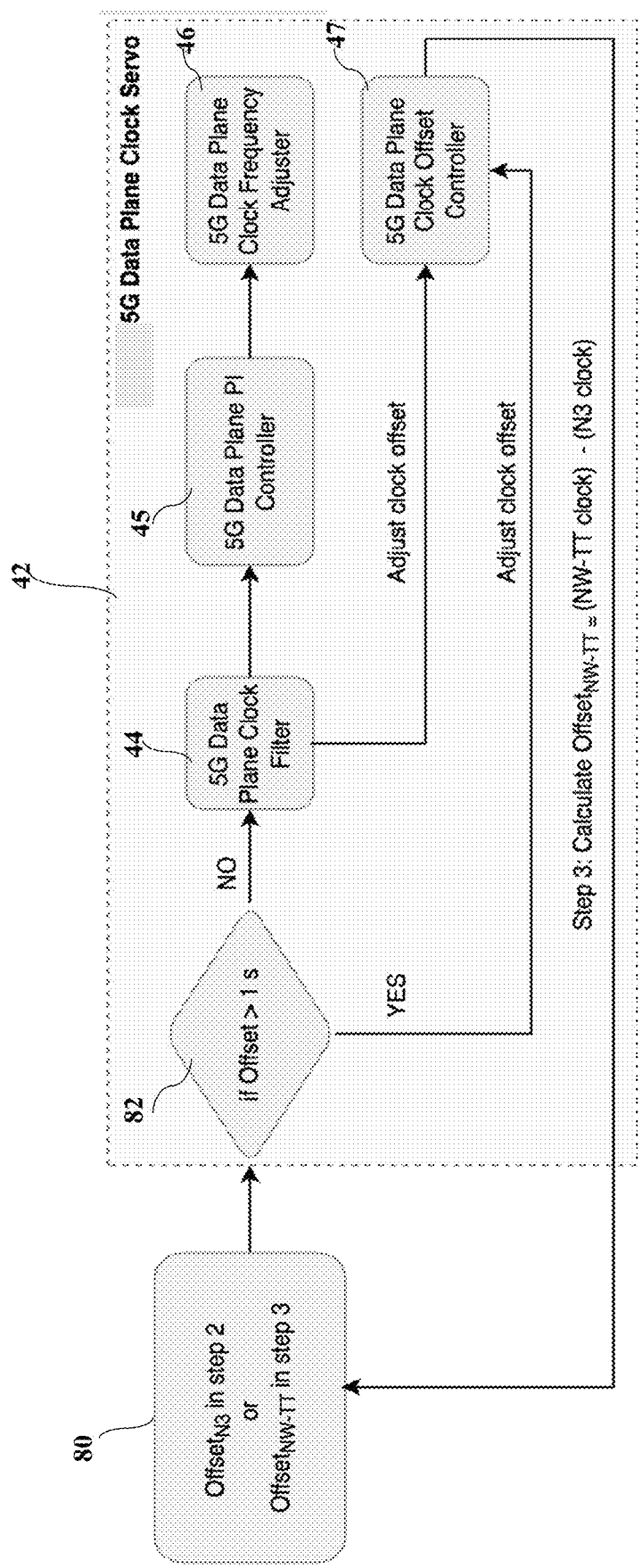
FIG. 8 is a functional block schematic diagram of a 5G Data Plane Clock Servo module implementing the steps of the method in accordance with the invention.

FIG. 8 is a functional block schematic diagram of the 5G Data Plane Clock Servo module 42 implementing the steps of the method in accordance with the invention.

In the method, the first time offset value (Offset$_{N3}$) or the second time offset value (Offset$_{NW-TT}$) are used as inputs 80 to the 5G Data Plane Clock Servo module 42 in the UPF 20.

The method may include determining at step 82 if the received first time offset value (Offset$_{N3}$) or second time offset value (Offset$_{NW-TT}$) is greater than a predetermined, calculated or selected time period. The predetermined, calculated or selected time period may take different values dependent on different communication network scenarios and/or applications. In one embodiment, the predetermined, calculated or selected time period may equal 1 second. If yes, the method may involve at step 81 controlling the 5G Data Plane Clock Servo module 42 to send the first time offset value (Offset$_{N3}$) to the 5G Data Plane Clock Offset Controller 47 to adjust the time of the UPF N3 interface 24 with respect to the 5G GM 18 or to send or the second time offset value (Offset$_{NW-TT}$) to the 5G Data Plane Clock Offset Controller 47 to adjust the time of the NW-TT module 26 with respect to the 5G GM 18.

If at step 82, the determination is "no", then using the received first time offset value (Offset$_{N3}$) or second time offset value (Offset$_{NW-TT}$) as an input to the 5G Data Plane Clock Filter 44. The 5G Data Plane Clock Filter 44 comprises a moving average filter and, upon receiving the first time offset value (Offset$_{N3}$) or the second time offset value (Offset$_{NW-TT}$), smooths the received first time offset value (Offset$_{N3}$) or second time offset value (Offset$_{NW-TT}$) to attenuate impulse noise to generate a smoothed clock offset output for the 5G Data Plane Clock Offset Controller 47.

Figure 9:
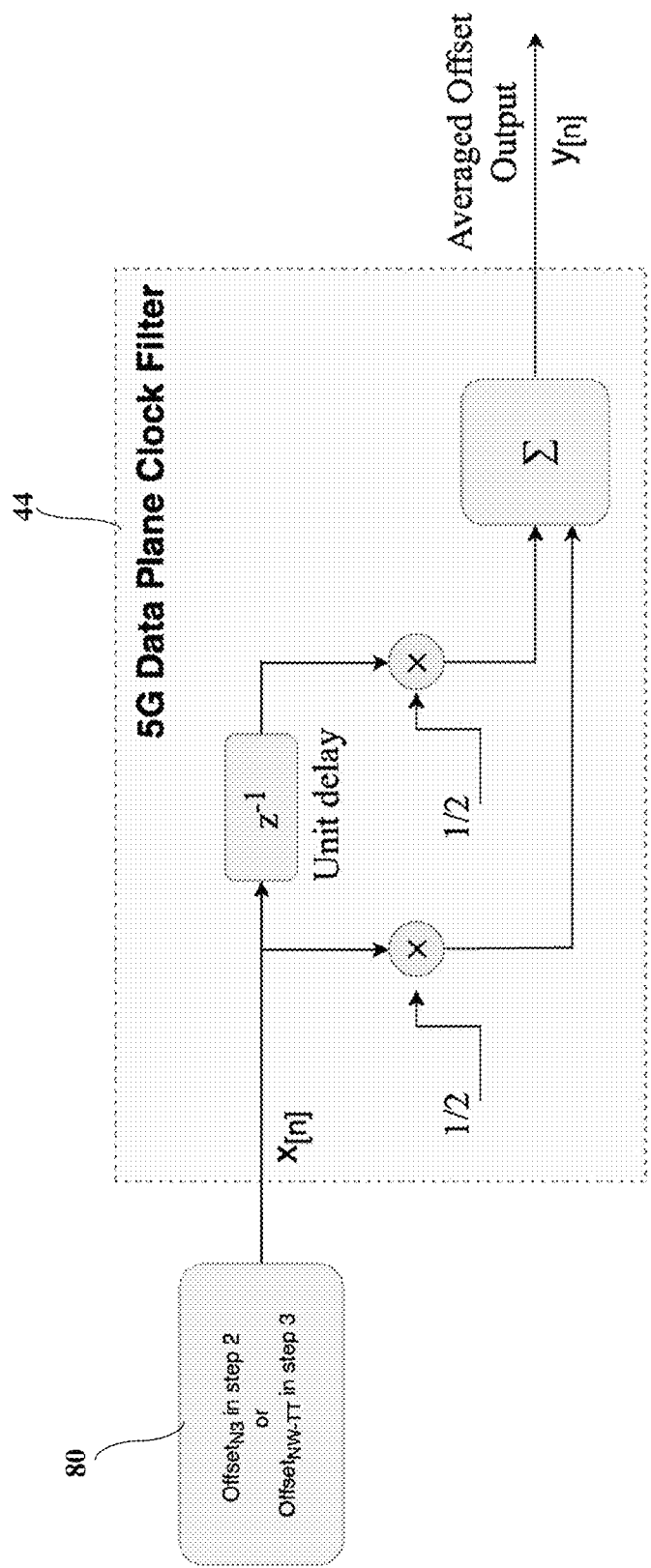
FIG. 9 is a functional block schematic diagram of a 5G Data Plane Clock Filter for the 5G Data Plane Clock Servo module in accordance with the invention.

Referring to FIG. 9 which provides a functional block schematic diagram of the 5G Data Plane Clock Filter 44, the moving average filter is based on a Low Pass Finite Impulse Response (FIR) filter as are commonly used for smoothing arrays and, in this instance, is used to smooth Offset$_{N3}$ in part ② or Offset$_{NW-TT}$ in part ③. The Impulse noise (occasionally large offset) could be due to periods of delayed execution caused by burst in processing or interrupted loads. The 5G Data Plane Clock Filter 44 attenuates the impulse noise to keep jitter out of the clock servo module 42.

In FIG. 9, the unit delay is preferably a $z^{-1}$ operator in Z-transform notation. The clock offset output $y_{[n]}$ from moving average filter is a two-sample average given by:

$$y_{[n]} = \frac{x_{[n]}}{2} + \frac{x_{[n-1]}}{2}.$$

Referring again to FIG. 8, the method includes using the 5G Data Plane Proportional-integral (PI) Controller 45 to receives the smoothed clock offset output for the received first time offset value (Offset$_{N3}$) or second time offset value (Offset$_{NW-TT}$) and to produce a fractional tick-rate adjustment u(t) value which coordinates the UPF N3 interface time with the 5G GM time or coordinates the NW-TT module time with the UPF N3 interface time.

Figure 10:
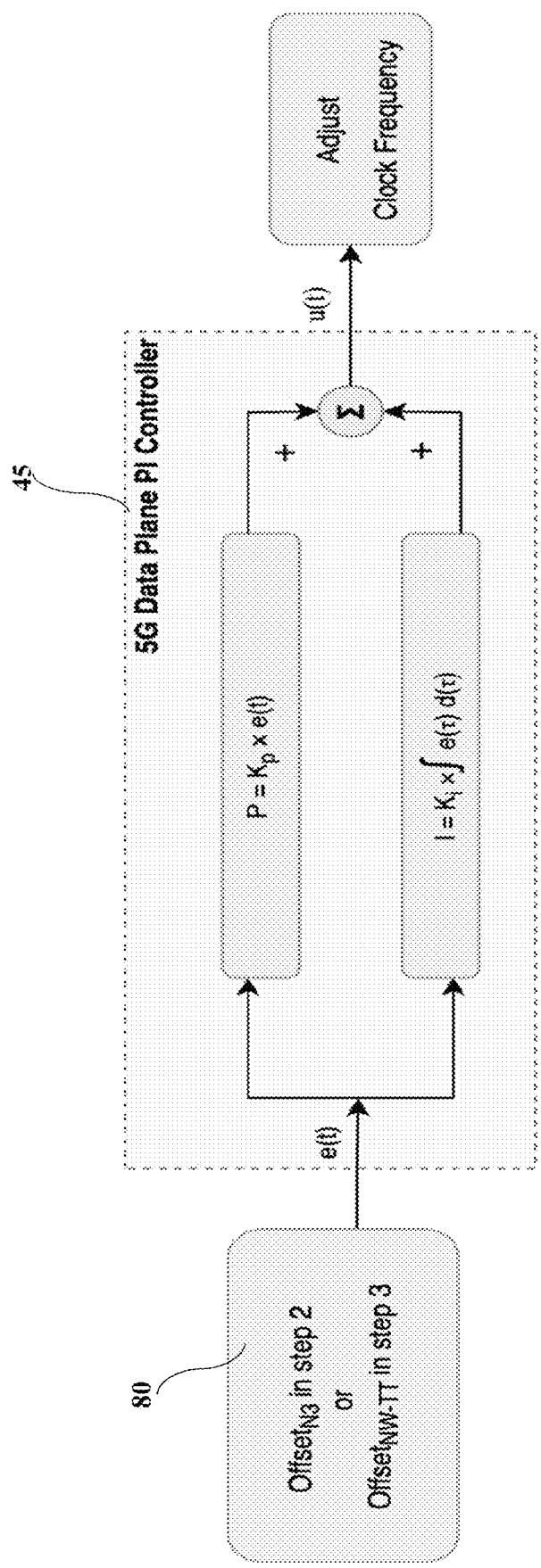
FIG. 10 is a functional block schematic diagram of a 5G Data Plane PI Controller for the 5G Data Plane Clock Servo module in accordance with the invention.

Referring to FIG. 10 which provides a functional block schematic diagram of a 5G Data Plane PI Controller 45, the proportional (P) term tracks and corrects the direct input, which is the time difference between the two clocks, the integral (I) term tracks and corrects the steady-state error, which is the frequency difference between the two clocks, and the $K_p$ and $K_i$ tuning parameters may be either static or dynamically adjusted according to deployment scenarios such that:

$$u(t) = K_p e(t) + K_i \int_0^t e(\tau) d\tau.$$

where $K_p$ is the proportional gain, a tuning parameter;
$K_i$ is the integral gain, a tuning parameter;
e(t) is the Clock error(offset) between the 5G GM 18 and the UPF N3 interface 24 or the and NW-TT module 26;
t is the time or instantaneous time (current time t); and
z is the variable of integration (takes on values from time 0 to the current time t).

The method also includes using 5G Data Plane Clock Frequency Adjuster 46 to receive the fractional tick-rate adjustment u(t) value for the UPF N3 interface or the NW-TT module and adjust the respective clock frequency accordingly.

The 5G Data Plane Clock Offset Controller 47 receives the smoothed clock offset output and adjusts the timing of the UPF N3 interface or the timing of the NW-TT module.

In brief, the method involves in part ② of having the UPF 20 use the first Offset$_{N3}$ from part ① as one input of the 5G Data Plane Clock Servo module 42 in accordance with the invention to achieve the time synchronization between the UPF N3 interface 24 and the 5G GM 18. The method also involves in part ③ of having the UPF 20 use the second Offset$_{NW-TT}$ calculated by the 5G Data Plane Clock Offset Controller 47 as one input of the 5G Data Plane Clock Servo module 42 to achieve the time synchronization between the NW-TT module 26 and the UPF N3 interface 24, in order to keep high precision time synchronization between the NW-TT module 26 on the UPF 20 with the 5G GM 18.

Parts ② and ③ share the same 5G Data Plane Clock Servo module 42 to adjust the clock frequencies and timing offsets. The 5G Data Plane Filter 44 and the 5G Data Plane PI Controller 46 in clock servo mediate the offsets to generate a fractional tick-rate adjustment that disciplines the clock frequency.

The invention also provides a 5G Data Plane Clock Servo module in a UPF module for synchronizing a Network-Side Time-Sensitive Networking (TSN) Translator (NW-TT) module inside a User Plane Function (UPF) of a 5G communication network with a 5G Grandmaster (GM) in a 5G Time Domain of the 5G communication network, the 5G Data Plane Clock Servo module comprising: a module for receiving a first time offset value (Offset$_{N3}$) between the 5G GM and a UPF N3 interface or a second time offset value (Offset$_{NW-TT}$) between the UPF N3 interface and the NW-TT module, the first time offset value (Offset$_{N3}$) being determined from one or more Precision Time Protocol (PTP) or Generalized Precision Time Protocol (gPTP) messages received at the N3 interface, and the second time offset value (Offset$_{NW-TT}$) being determined from a hardware clock of the NW-TT module and a synchronized clock of the UPF N3 interface; a module for determining if the received first time offset value (Offset$_{N3}$) or second time offset value (Offset$_{NW-TT}$) is greater than a predetermined, calculated or selected time period; a 5G Data Plane Clock Filter comprising a moving average filter which, upon receiving the first time offset value (Offset$_{N3}$) or the second time offset value (Offset$_{NW-TT}$), smooths the received first time offset value (Offset$_{N3}$) or second time offset value (Offset$_{NW-TT}$) to attenuate impulse noise to generate a smoothed clock offset output for the 5G Data Plane Clock Offset Controller;

a 5G Data Plane Proportional-integral (PI) Controller for receiving the smoothed clock offset output for the received first time offset value (Offset$_{N3}$) or second time offset value (Offset$_{NW-TT}$) to produce a fractional tick-rate adjustment u(t) value which coordinates the UPF N3 interface time with the 5G GM tie or coordinates the NW-TT module time with the UPF N3 interface time; and a 5G Data Plane Clock Frequency Adjuster for receiving the fractional tick-rate adjustment u(t) value for the UPF N3 interface or the NW-TT module to adjust the respective clock frequency accordingly; wherein the 5G Data Plane Clock Offset Controller receives the smoothed clock offset output and adjusts the timing of the UPF N3 interface or the timing of the NW-TT module.

The invention also provides a UPF module for synchronizing a Network-Side Time-Sensitive Networking (TSN) Translator (NW-TT) module inside a User Plane Function (UPF) of a 5G communication network with a 5G Grandmaster (GM) in a 5G Time Domain of the 5G communication network, the module comprising a memory storing machine-readable instructions and a processor for executing the machine-readable instructions such that, when the processor executes the machine-readable instructions, it configures the UPF module to perform the steps of the method of any one of the appended method claims.

The invention also provides a non-transitory computer-readable medium storing machine-readable instructions, wherein, when the machine-readable instructions are executed by a processor, they configure the processor to implement the method of any one of the appended method claims.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of synchronizing a Network-Side Time-Sensitive Networking (TSN) Translator (NW-TT) module inside a User Plane Function (UPF) of a communication network with a Grandmaster (GM) in a Time Domain of the communication network, the method comprising the steps of:
    receiving one or more Precision Time Protocol (PTP) or Generalized Precision Time Protocol (gPTP) messages on an N3 interface of the UPF;
    determining a first time offset value ($Offset_{N3}$) between the GM and the UPF N3 interface based on information received in the one or more PTP or gPTP messages;
    adjusting a time of the UPF N3 interface using the determined first time offset value ($Offset_{N3}$) to synchronize the time between the UPF N3 interface and the GM;
    determining a second time offset value ($Offset_{NW-TT}$) between the UPF N3 interface and the NW-TT module; and
    adjusting a time of the NW-TT module using the determined second time offset value ($Offset_{NW-TT}$) to synchronize the time between the NW-TT module and the GM.

2. The method of claim 1, comprising the steps of:
    using the determined first time offset value ($Offset_{N3}$) to determine a UPF N3 interface clock frequency adjustment value; and
    adjusting a clock frequency of the UPF N3 interface using the UPF N3 interface clock frequency adjustment value.

3. The method of claim 2, comprising the steps of:
    using the second time offset value ($Offset_{NW-TT}$) to determine a NW-TT module clock frequency adjustment value; and
    adjusting a clock frequency of the NW-TT module using the NW-TT module clock frequency adjustment value.

4. The method of claim 1, wherein the one or more PTP or gPTP messages are received from a network node in the Time Domain of the communication network.

5. The method of claim 4, wherein the network node comprises a base station (gNB).

6. The method of claim 1, wherein the second time offset value ($Offset_{NW-TT}$) between the UPF N3 interface and the NW-TT module is determined using information obtained at an N6 interface of the UPF.

7. The method of claim 3, comprising:
    providing a Data Plane Clock Servo module in the UPF;
    using the first time offset value ($Offset_{N3}$) as an input to the Data Plane Clock Servo module; and
    based on said first time offset value ($Offset_{N3}$), performing the steps at the Data Plane Clock Servo module of:
        adjusting the time of the UPF N3 interface to synchronize the time between the UPF N3 interface and the GM;
        determining the UPF N3 interface clock frequency adjustment value; and
        adjusting the clock frequency of the UPF N3 interface using the UPF N3 interface clock frequency adjustment value.

8. The method of claim 7, comprising:
    using the second time offset value ($Offset_{NW-TT}$) as an input to the Data Plane Clock Servo module; and based on said second time offset value (Offset$_{NW-TT}$), performing the steps at the Data Plane Clock Servo module of:
  adjusting the time of the NW-TT module to synchronize the time between the NW-TT module and the GM;
  determine the NW-TT module clock frequency adjustment value; and
  adjusting the clock frequency of the NW-TT module using the NW-TT module clock frequency adjustment value.

9. The method of claim 8, wherein the one or more PTP or gPTP messages received by the UPF N3 interface contain synchronization information in peer-to-peer mode or end-to-end mode and the method comprises the steps of:
  storing a first time T$_1$ relating to sending a PTP or gPTP Pdelay_Req message;
  extracting a second time T$_2$ from a PTP or gPTP Pdelay_Resp message;
  extracting a third time T$_3$ from a PTP or gPTP Pdelay_Resp_Follow_Up message;
  storing a fourth time T$_4$ relating to receiving a PTP or gPTP Pdelay_Resp message; and
  determining a UPF N3 interface delay (Delay$_{N3}$) from the formula:

$$\text{Delay}_{N3} = [(T_2 - T_1) + (T_4 - T_3)]/2.$$

10. The method of claim 9, comprising the steps of:
  extracting a fifth time T$_5$ and a Correction Field (CF) elapsed time value from a PTP or gPTP Follow_Up message;
  storing a sixth time T$_6$ relating to receiving a PTP or gPTP Sync message; and
  determining the first time offset value (Offset$_{N3}$) between the GM and the UPF N3 interface from the formula:

$$\text{Offset}_{N3} = (T_6 - T_5) - \text{Delay}_{N3} - CF \text{ elapsed time value.}$$

11. The method of claim 10, wherein the second time offset value (Offset$_{NW-TT}$) between the UPF N3 interface and the NW-TT module is determined from a hardware clock of the NW-TT module and a synchronized clock of the UPF N3 interface from the formula:

$$\text{Offset}_{NW-TT} = T_{NW-TT} - T_{N3},$$

where
  T$_{NW-TT}$ is a time retrieved from the NW-TT module clock; and
  T$_{N3}$ is a time retrieved from the UPF N3 interface synchronized clock.

12. The method of claim 11, wherein the Data Plane Clock Servo module in the UPF receives the first time offset value (Offset$_{N3}$) or the second time offset value (Offset$_{NW-TT}$) as an input, the method including the steps of;
  determining if the received first time offset value (Offset$_{N3}$) or second time offset value (Offset$_{NW-TT}$) is greater than a predetermined, calculated or selected time period and, if yes, controlling the Data Plane Clock Servo module to send the first time offset value (Offset$_{N3}$) or the second time offset value (Offset$_{NW-TT}$) to a Data Plane Clock Offset Controller of the Data Plane Clock Servo module to adjust the time of the UPF N3 interface or to adjust the time of the NW-TT module; and, if no, using the received first time offset value (Offset$_{N3}$) or second time offset value (Offset$_{NW-TT}$) as an input to a Data Plane Clock Filter of the Data Plane Clock Servo module.

13. The method of claim 12, wherein the predetermined, calculated or selected time period takes different values dependent on different communication network scenarios and/or applications.

14. The method of claim 12, wherein the Data Plane Clock Filter comprises a moving average filter and, upon receiving the first time offset value (Offset$_{N3}$) or the second time offset value (Offset$_{NW-TT}$), smooths the received first time offset value (Offset$_{N3}$) or second time offset value (Offset$_{NW-TT}$) to attenuate impulse noise to generate a smoothed clock offset output for the Data Plane Clock Offset Controller.

15. The method of claim 14, wherein a Data Plane Proportional-integral (PI) Controller of the Data Plane Clock Servo module receives the smoothed clock offset output for the received first time offset value (Offset$_{N3}$) or second time offset value (Offset$_{NW-TT}$) and to produces a fractional tick-rate adjustment u(t) value which coordinates the UPF N3 interface time with the GM time or coordinates the NW-TT module time with the UPF N3 interface time.

16. The method of claim 15, wherein a Data Plane Clock Frequency Adjuster of the Data Plane Clock Servo module receives the fractional tick-rate adjustment u(t) value for the UPF N3 interface or the NW-TT module and adjust the respective clock frequency accordingly.

17. The method of claim 14, wherein the Data Plane Clock Offset Controller receives the smoothed clock offset output and adjust the timing of the UPF N3 interface or the timing of the NW-TT module.

18. A UPF module for synchronizing a Network-Side Time-Sensitive Networking (TSN) Translator (NW-TT) module inside a User Plane Function (UPF) of a communication network with a Grandmaster (GM) in a Time Domain of the communication network, the module comprising:
  a memory storing machine-readable instructions; and
  a processor for executing the machine-readable instructions such that, when the processor executes the machine-readable instructions, it configures the UPF module to perform the steps of:
    receiving one or more Precision Time Protocol (PTP) or Generalized Precision Time Protocol (gPTP) messages on an N3 interface of the UPF;
    determining a first time offset value (Offset$_{N3}$) between the GM and the UPF N3 interface based on information received in the one or more PTP or gPTP messages;
    adjusting a time of the UPF N3 interface using the determined first time offset value (Offset$_{N3}$) to synchronize the time between the UPF N3 interface and the GM;
    determining a second time offset value (Offset$_{NW-TT}$) between the UPF N3 interface and the NW-TT module; and
    adjusting a time of the NW-TT module using the determined second time offset value (Offset$_{NW-TT}$) to synchronize the time between the NW-TT module and the GM.

19. The UPF module of claim 18, wherein:
- the step of adjusting the time of the UPF N3 interface using the determined first time offset value (Offset$_{N3}$) comprises adjusting the time of the UPF N3 interface using a smoothed value of the determined first time offset value (Offset$_{N3}$); and
- the step of adjusting the time of the NW-TT module using the determined second time offset value (Offset$_{NW-TT}$) comprises adjusting the time of the NW-TT module using a smoothed value of the second time offset value (Offset$_{NW-TT}$).

20. A Data Plane Clock Servo module in a UPF module for synchronizing a Network-Side Time-Sensitive Networking (TSN) Translator (NW-TT) module inside a User Plane Function (UPF) of a communication network with a Grandmaster (GM) in a Time Domain of the communication network, the Data Plane Clock Servo module comprising:
- a memory storing machine-readable instructions; and
- a processor for executing the machine-readable instructions such that, when the processor executes the machine-readable instructions, it configures the Data Plane Clock Servo module comprising:
  - a first module for receiving a first time offset value (Offset$_{N3}$) between the GM and a UPF N3 interface or a second time offset value (Offset$_{NW-TT}$) between the UPF N3 interface and the NW-TT module, the first time offset value (Offset$_{N3}$) being determined from one or more Precision Time Protocol (PTP) or Generalized Precision Time Protocol (gPTP) messages received at the N3 interface, and the second time offset value (Offset$_{NW-TT}$) being determined from a hardware clock of the NW-TT module and a synchronized clock of the UPF N3 interface;
  - a second module for determining if the received first time offset value (Offset$_{N3}$) or second time offset value (Offset$_{NW-TT}$) is greater than a predetermined, calculated, or selected time period;
  - a Data Plane Clock Filter comprising a moving average filter which, upon receiving the first time offset value (Offset$_{N3}$) or the second time offset value (Offset$_{NW-TT}$), smooths the received first time offset value (Offset$_{N3}$) or second time offset value (Offset$_{NW-TT}$) to attenuate impulse noise to generate a smoothed clock offset output for the Data Plane Clock Offset Controller;
  - a Data Plane Proportional-integral (PI) Controller for receiving the smoothed clock offset output for the received first time offset value (Offset$_{N3}$) or second time offset value (Offset$_{NW-TT}$) to produce a fractional tick-rate adjustment u(t) value which coordinates the UPF N3 interface time with the GM tie or coordinates the NW-TT module time with the UPF N3 interface time; and
  - a Data Plane Clock Frequency Adjuster for receiving the fractional tick-rate adjustment u(t) value for the UPF N3 interface or the NW-TT module to adjust the respective clock frequency accordingly;
  - wherein the Data Plane Clock Offset Controller receives the smoothed clock offset output and adjusts the timing of the UPF N3 interface or the timing of the NW-TT module.

* * * * *